United States Patent [19]
Smith et al.

[11] Patent Number: 5,632,061
[45] Date of Patent: May 27, 1997

[54] ASSIST STRAP

[75] Inventors: Nels R. Smith, Holland; Jerry M. De Jong, West Olive, both of Mich.

[73] Assignee: Prince Corporation, Holland, Mich.

[21] Appl. No.: 619,119

[22] Filed: Mar. 20, 1996

Related U.S. Application Data

[63] Continuation of Ser. No. 314,863, Sep. 29, 1994, abandoned.
[51] Int. Cl.⁶ .................................................. A47B 95/02
[52] U.S. Cl. ........................ 16/110 R; 16/124; 403/329
[58] Field of Search ........................ 16/110 R, 111 R, 16/114 R, 124, 125, DIG. 18, DIG. 19, DIG. 24, DIG. 2; 74/543; 403/327, 329, 326

[56] References Cited

U.S. PATENT DOCUMENTS

| | | | |
|---|---|---|---|
| D. 327,865 | 7/1992 | Falcoff et al. | |
| 430,984 | 6/1890 | Benvenisti. | |
| 702,746 | 6/1902 | Riegel | 16/114 R |
| 2,067,329 | 1/1937 | McGuffin | 403/327 |
| 2,486,557 | 11/1949 | Flora. | |
| 3,514,904 | 6/1970 | Riegelman | 16/114 R |
| 3,604,052 | 9/1971 | Bringer | 16/115 |
| 3,621,510 | 11/1971 | Rollins, Jr. | 16/114 R |
| 3,621,511 | 11/1971 | Webb-Selley et al. | 16/114 R |
| 3,897,607 | 8/1975 | Schaffer et al. | 16/114 R |
| 4,064,594 | 12/1977 | Teti et al. | 16/125 |
| 4,404,709 | 9/1983 | Janz et al. | |
| 4,686,609 | 8/1987 | Dykstra et al. | |
| 4,912,808 | 4/1990 | Blakely | 16/114 R |
| 4,981,322 | 1/1991 | Dowd et al. | |
| 4,981,323 | 1/1991 | Dowd et al. | |
| 5,161,700 | 11/1992 | Stannis et al. | |
| 5,285,551 | 2/1994 | Weiland et al. | |
| 5,337,911 | 8/1994 | Holub | 16/383 |
| 5,519,917 | 5/1996 | Cordonnier | 16/DIG. 24 |

FOREIGN PATENT DOCUMENTS 1193912  6/1970  United Kingdom ............... 16/124

*Primary Examiner*—M. Rachuba
*Assistant Examiner*—Donald M. Gurley
*Attorney, Agent, or Firm*—Price, Heneveld, Cooper, DeWitt & Litton

[57] ABSTRACT

An assist strap including an elongated handle-shaped body having opposite ends with inwardly projecting locking flanges formed on a tapered locking member. The locking flange is spaced from an opposed support surface a distance to compressibly engage the vehicle's sheet metal roof and surrounding headliner material. The tapered locking member includes a spring mounted on a side of the locking member opposite the locking flange for urging the flange into continued contact with the supporting sheet metal thereby holding the assist strap in secure engagement within an aperture formed in the vehicle sheet metal structure.

13 Claims, 2 Drawing Sheets

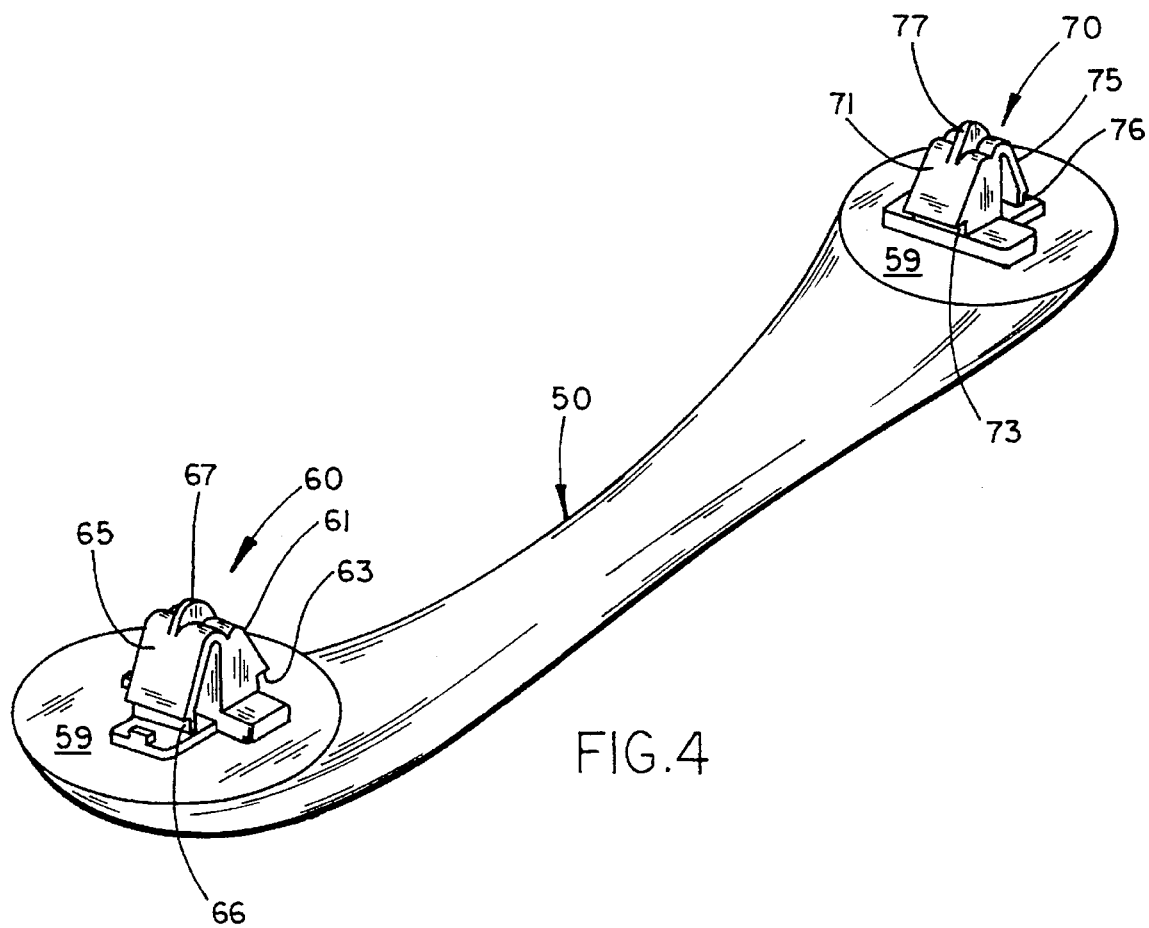
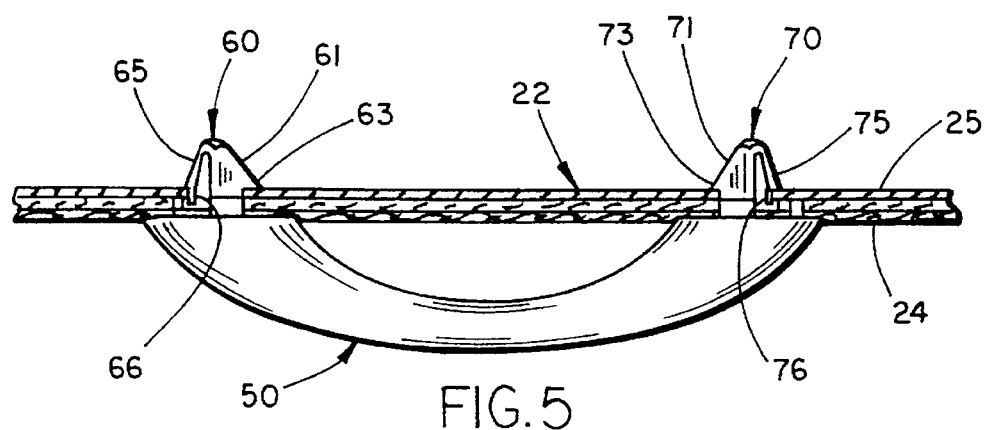

ASSIST STRAP

This is a continuation of application Ser. No. 08/314,863, filed on Sep. 29, 1994, now abandoned.

BACKGROUND OF THE INVENTION

The present invention relates to vehicle accessories and particularly to structure for mounting an assist strap to the underlying sheet metal support of an automobile.

Vehicles such as automobiles frequently include assist straps, sometimes referred to as grabhandles, for assistance to the vehicle operator or passenger in ingress and egress from the vehicle. Such assist straps typically are located above the vehicle door such they can be grasped to help the vehicle occupant in raising themselves from the vehicle seat and exiting the door or alternatively supporting some of the occupant's weight as they are lowering themselves into the vehicle seat. There have been a variety of manners in which such assist straps have been mounted to vehicles. In the past, assist straps typically have included a metal strap covered by suitable padding and upholstery material with the ends of the strap configured with an aperture for receiving a fastening screw which secures the strap directly to an aperture within the vehicle sheet metal support structure. Such end structure typically includes a decorative covering for enclosing the fastener head once the strap has been installed. In recent years, assist straps have been preassembled as part of an integral headliner assembly with a variety of snap-in spring clip fasteners for attachment of the grabhandle to the headliner. Such arrangement typically still requires the utilization of a fastening screw for attaching the assist scrap to the spring clip during its preassembly to the vehicle headliner. Other approaches have incorporated the use of L-shaped configured ends of an assist strap with a bezel which fits into an aperture within the vehicle roof and a subsequent decorative bezel locks the assist strap into position once initially inserted into the vehicle roof.

SUMMARY OF THE PRESENT INVENTION

The assist strap of the present invention provides for ease of installation of an integral assist strap which does not require separate fasteners or special bezel locking devices but which snap-fits within a vehicle roof opening and subsequently automatically locks into position. For such purpose, an assist strap embodying the present invention includes a strap body having opposite ends, each including an inwardly projecting locking flange formed on a tapered locking member with the locking flange being spaced from an opposed support surface a distance to compressibly engage the vehicle's sheet metal roof and surrounding headliner material. The tapered locking member includes a spring mounted on a side of the locking member opposite the locking flange for urging the flange into continued contact with the supporting sheet metal thereby holding the assist strap in secure engagement within an aperture formed in the vehicle sheet metal structure. A subsequent pulling force during use of the assist strap increases the holding force of the inwardly directed facing locking flanges of the assist strap.

In one embodiment of the invention, the spring was provided as a separate member while in another embodiment the spring was integrally formed with the locking member. Such construction provides a relatively inexpensive assist strap which can be integrally molded and easily installed in a vehicle to provide a modern appearance to the assist strap and one which does not require the use of separate fasteners or special installation techniques. These and other features, objects and advantages of the present invention will become apparent upon reading the following description thereof together with reference to the accompanying drawings in which:

BRIEF DESCRIPTION OF THE DRAWINGS

FIG. 4 is a perspective view of an alternative embodiment of the assist strap of the present invention; and FIG. 5 is a reduced scale fragmentary cross-sectional view of the assist strap shown in FIG. 4 shown in an installed position.

DETAILED DESCRIPTION OF THE PREFERRED EMBODIMENT

Figure 1:
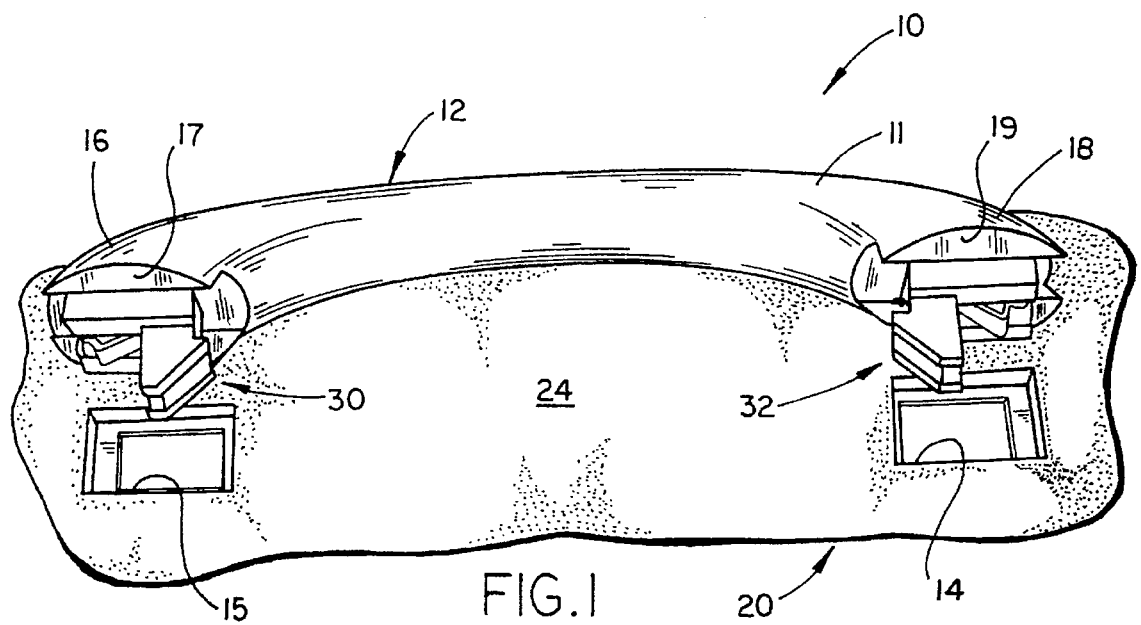
FIG. 1 is an exploded fragmentary view of a section of the vehicle roof together with an assist strap embodying the present invention.
Figure 2:
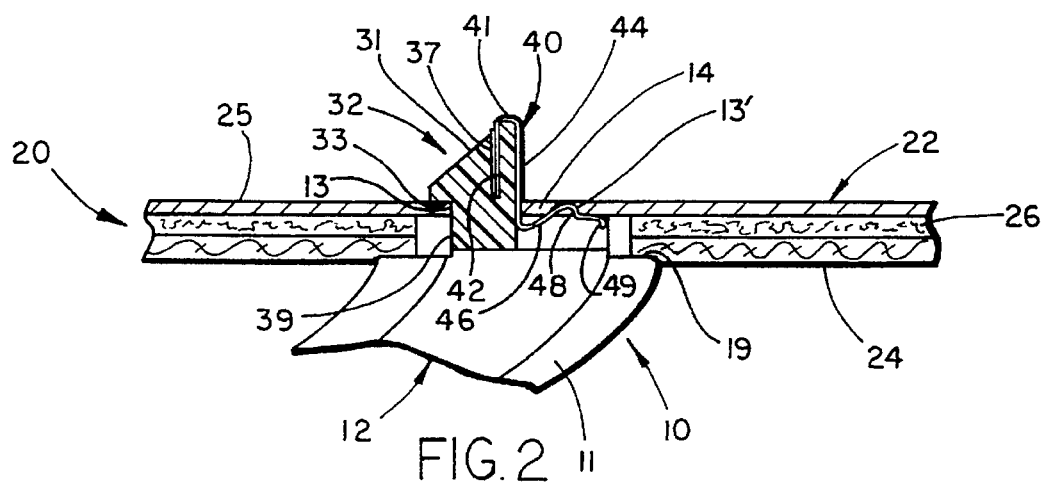
FIG. 2 is an enlarged fragmentary vertical cross-sectional view of one end of the assist strap shown in FIG. 1 shown mounted to the vehicle roof.

Referring initially to FIG. 1 there is shown an assist strap 10 embodying the present invention for mounting within a pair of generally rectangular apertures 15 and 14 formed in a roof 20 of a vehicle typically above a vehicle door. The vehicle roof will include an underlying sheet metal support 22 (FIG. 2) and a headliner which can be a composite of various materials including an outer upholstery material 24 and underlying supporting substrate 26. Assist strap 10 includes a body 12 which is elongated and has a generally curved handle shape with opposite ends 16 and 18 from which there extends a pair of symmetrical locking members 30 and 32, respectively. Each of the locking members 30 and 32 are substantially identical but mirror images of one another so that only one will be described in detail. The locking members can be integrally molded with the assist strap body 12 which may be made of a suitable generally resilient polymeric material such as ABS, PVC, polycarbonate or the like. Further, the assist strap 10 may include an outer decorative surface 11 which can be a pebble grain or other texture formed in the material forming the assist strap or can be a skin of a different material which is molded together with the body and integral locking members of the assist strap. Each of the ends 16 and 18 of the assist strap 12 include a support surface 17 and 19, respectively, which faces and engages the outer surface of the headliner and roof as best seen in FIG. 2 once the assist strap is installed. The locking member 32 is now described in greater detail in connection with FIGS. 2 and 3.

Referring initially to FIG. 2, the rectangular aperture 14 for receiving locking member 32 includes opposed edges 13 and 13' with the locking member 32 including a tapered lead-in surface 31 terminating in a locking flange 33 spaced a distance from support surface 19 to compressibly engage the upper surface 25 of sheet metal support structure 22 with surface 19 engaging the outer decorative upholstery material 24 as seen in FIG. 2. Locking flange 33 overlies edge 13 of the aperture 14 and the corresponding locking member 30 includes a locking flange spaced from flange 33 a distance so that in its unflexed position, the assist strap locking flange 33 will rest against the inner edges of the corresponding apertures 15 and 14.

The locking member 32 includes a spring 40 which has a generally U-shaped upper section having a downwardly depending leg 42 which fits within a slot 37 formed downwardly near the top of lead-in surface 31 as best seen in FIG. 2. Spring 40 has a base leg 41 which overlies the top 35 of locking member 32 and a downwardly depending leg 44 which extends adjacent the rear surface 38 (FIG. 3) of locking member 32. Spring 40 then curves upwardly in an upwardly inclined leg 46 which extends outwardly from surface 30 and includes an end which is downwardly curved defining a contacting segment 48 and a downwardly depending tip 49. Segment 48 of spring 40 engages edge 13' of aperture 14 as seen in FIG. 2. Leg 46 of spring 40 is of a length such that the spring provides a bias force urging the front contacting surface 39 of locking member 32 and flange 33 into engagement with edge 13 of aperture 14 while the generally vertically extending segment 48 of spring 40 compresses spring section 46 to hold the locking member in tight engagement within aperture 14.

Figure 3:
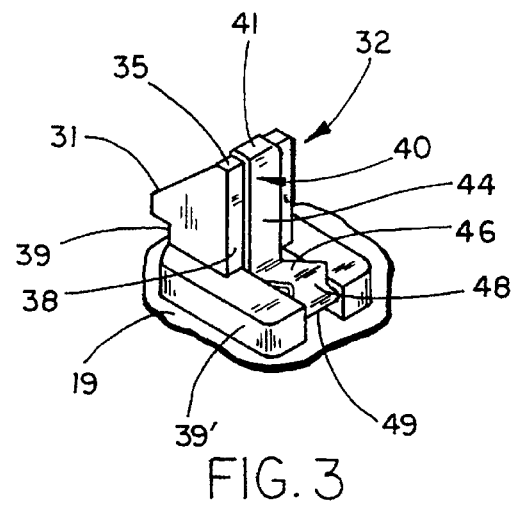
FIG. 3 is a fragmentary perspective view of the one end of the assist strap shown in FIG. 2.

Spring 40 may be made of any suitable spring material such as beryllium, copper or a spring-steel material surface treated to resist rust and generally conform to the automotive environment. Spring 40 may be integrally molded within slot 37 if the locking member is molded around the spring positioned in the mold during the manufacture of the assist strap. Alternatively, the spring can be separately inserted in a separately formed slot 37. As seen in FIG. 3 the locking member 32 has a generally rectangular base 39' which substantially fills the aperture 14 which includes a somewhat larger section for the headliner than the narrowed portion through the sheet metal underlying support as best seen in FIG. 2.

The assist strap shown in FIGS. 1–3 is installed by snap-fitting one end into an aperture with the lip 33 overlying the inner edge of one of the apertures and subsequently resiliently deflecting the body 12 of assist strap 10 such that the remaining locking flange 33 at its opposite end clears the interfacing edge of the associated aperture and pushing the grabhandle into the aperture until spring 40 engages the opposite edge of the aperture. The tapered lead-in surface 31 of the locking member assists in its entry into the associated mounting aperture and once installed the natural resilience of the assist handle tends to hold the locking flanges in position with the spring 40 preventing removal.

In the alternative embodiment shown in FIGS. 4 and 5 an assist strap 50 is shown and can have a body construction substantially the same as assist strap 12. The locking members 60 and 70 mounted at opposite ends of the assist strap also include facing tapered lead-in edges 61 and 71, respectively, with locking flanges 63 and 73 overlying the sheet metal 25 of a vehicle roof 22. Each of the locking members 60 and 70 are molded to integrally include a downwardly depending spring 65 and 75, respectively, which is defined by a leg extending from the top of each of the locking members downwardly in spaced relationship to the body thereof and having a notch 66 and 76, respectively, which engages the edge of the respective associated apertures 14 and 16 in the sheet metal support structure 22 as best seen in FIG. 5 for holding the assist strap within the vehicle in the same manner as the structure shown in FIGS. 1–3. The locking members 60 and 70 may include a reinforcing rib 67 and 77, respectively, extending between the junction of the spring legs 65 and 75 and the main body of locking members 60 and 70, respectively. This provides stiffening of the spring legs 65 and 75 to securely hold the locking members in their associated mounting apertures in the sheet metal 22 of the vehicle.

As with assist strap 12, strap 50 also includes support surfaces 59 at opposite ends which cooperate in spaced relationship with locking flanges 63 and 73 and L-shaped notches 66 and 76 of the locking members for compressibly holding the assist strap between the top surface of the sheet metal support structure 25 and the outer decorative surface 24 of the headliner overlying the sheet metal support structure. As with the structure shown in FIGS. 1–3, assist strap 50 can be installed in a vehicle by first inserting one end of the strap into an associated aperture and subsequently deflecting the opposite end away from the first end until the inclined leading edge of the locking member rides over the inwardly facing edge of the associated notch until it snaps into place with the springs applying an opposed holding force preventing removal of the assist strap once snap-fitted into position.

It will become apparent to those skilled in the art the various modifications to the preferred embodiment of the invention as described herein can be made without departing from the spirit or scope thereof as defined by the appended claims.

The embodiments of the invention in which an exclusive property or privilege is claimed are defined as follows:

1. An assist strap for snap fitting into a pair of apertures formed in a support member of a vehicle comprising:

a handle-shaped body having opposed ends spaced from one another, with each end having a generally flat support surface;

a locking member integral with said body and extending generally perpendicularly from each end flat support surface of said body, each said locking member integrally including a tapered lead-in edge for assisting in extending each said locking member into a mounting aperture, each said lead-in edge terminating in a generally horizontally extending locking flange in spaced opposed and parallel relationship to said generally flat support surface, both flanges face inwardly toward each other; and a spring mounted to each said locking member and extending outwardly from its associated locking member in a direction opposite its associated locking flange to urge each locking flange toward the other into engagement with an edge of an aperture into which said locking member is mounted.

2. The assist strap as defined in claim 1 wherein said spring is integrally formed with said locking member.

3. The assist strap as defined in claim 2 wherein said spring is defined by a leg extending downwardly from a tip of said lead-in edge of said locking member.

4. The assist strap as defined in claim 1 wherein said body and said locking members are integrally molded of a polymeric material.

5. The assist strap as defined in claim 1 wherein said spring includes a leg extending into said locking member for anchoring one end of said spring to said locking member, said spring including a leg extending outwardly away from said lead-in edge and a segment extending to engage an edge of a mounting aperture opposite said locking flange.

6. An assist strap for snap fitting into a pair of apertures formed in a support member of a vehicle comprising:

a molded elongated resilient polymeric body defining a strap and having opposed ends spaced from one another, each end including a locking member including a tapered lead-in edge for assisting in extending each said locking member into a mounting aperture, said lead-in edge terminating in a generally horizontally extending flange, each end further including a support surface in spaced generally parallel relationship to its associated flange such that said flange engages one side of the vehicle underlying support structure and said support surfaces engage the opposite side of the vehicle support structure, wherein said tapered lead-in edges and horizontal extending flanges are formed in opposed inwardly facing relationship to one another such that a pulling force on said strap increases the holding force of said locking members; and a spring extending outwardly from each said locking member in a direction opposite said flange to urge said associated flange inwardly into engagement with the edge of an aperture into which each said locking member is mounted.

7. The assist strap as defined in claim 6 wherein said spring is defined by a leg extending downwardly from a type of said lead-in edge of said locking member.

8. The assist strap as defined in claim 6 wherein said spring includes a leg extending into said locking member for anchoring one end of said spring to said locking member, said spring including a leg extending outwardly away from said lead-in edge an end configured to engage an edge of a mounting aperture opposite said locking flange.

9. An assist strap for snap fitting into a pair of apertures formed in a support member of a vehicle comprising:

an elongated handle-shaped body having opposed ends;

a locking member extending from each end of said body in opposed facing relationship to increase the holding force of said locking members by urging said locking members toward one another in response to a pulling force on said handle-shaped body, said locking member including a tapered edge for assisting in extending said locking member into a mounting aperture, said tapered edge terminating in a generally horizontal extending locking flange spaced in opposed relationship to a support surface formed on said body; and a spring extending from said locking member in a direction opposite said locking flange for locking said body in place.

10. The assist strap as defined in claim 9 wherein said spring is integrally formed with said locking member.

11. The assist strap as defined in claim 9 wherein said spring is defined by a leg extending downwardly from a tip of said lead-in edge of said locking member.

12. The assist strap as defined in claim 9 wherein said body and said locking members are integrally molded of a polymeric material.

13. The assist strap as defined in claim 9 wherein said spring includes a leg extending into said locking member for anchoring one end of said spring to said locking member, said spring including a leg extending outwardly away from said lead-in edge and a segment extending to engage an edge of a mounting aperture opposite said locking flange.

* * * * *